June 8, 1965   D. P. FLANIGAN   3,187,714
ILLUMINATED OIL FILLER CAP WITH INDICATOR
Filed March 16, 1964   2 Sheets-Sheet 2
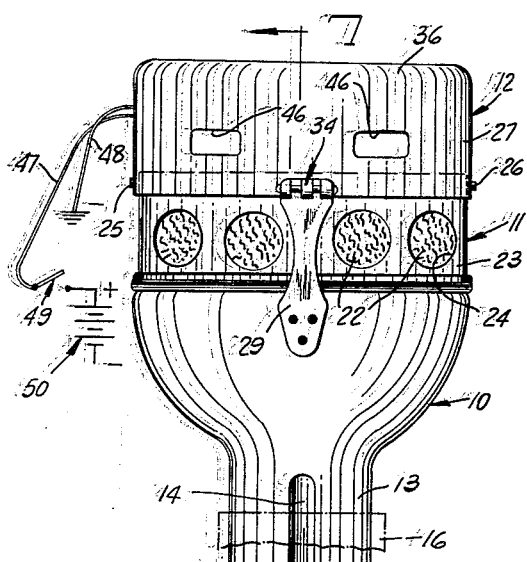
Fig.3
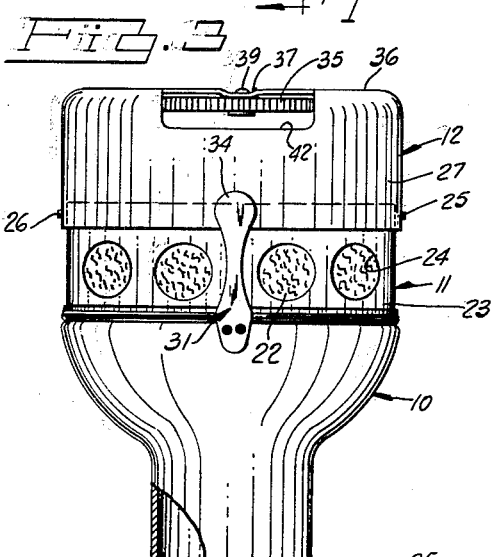
Fig.4
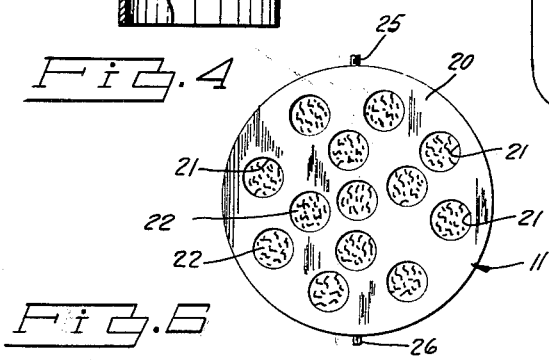
Fig.6
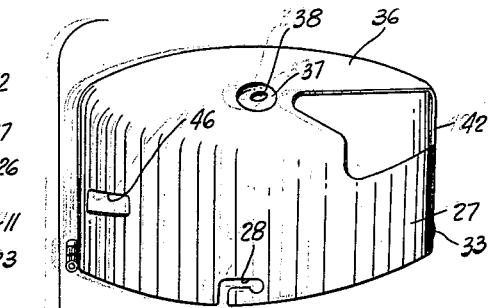
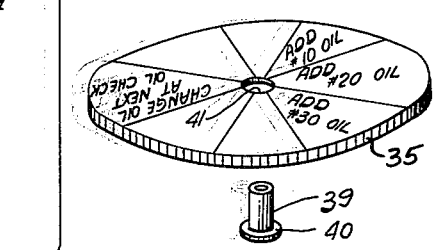
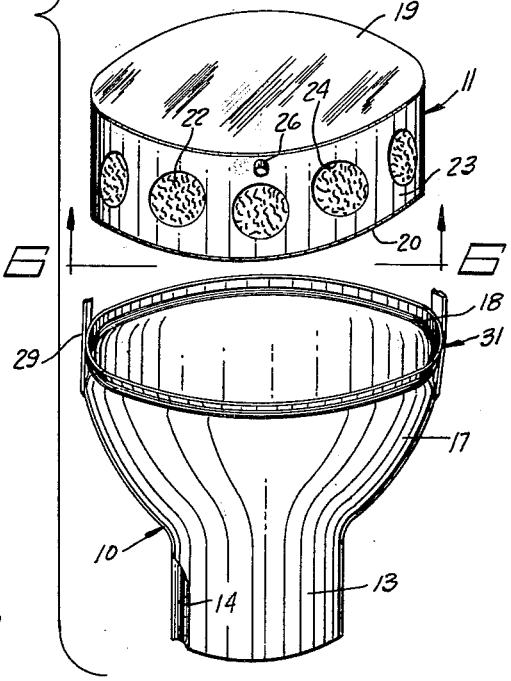
Fig.5
INVENTOR.
DAVID P. FLANIGAN
BY
Donnelly, Mentag & Harrington
ATTORNEYS

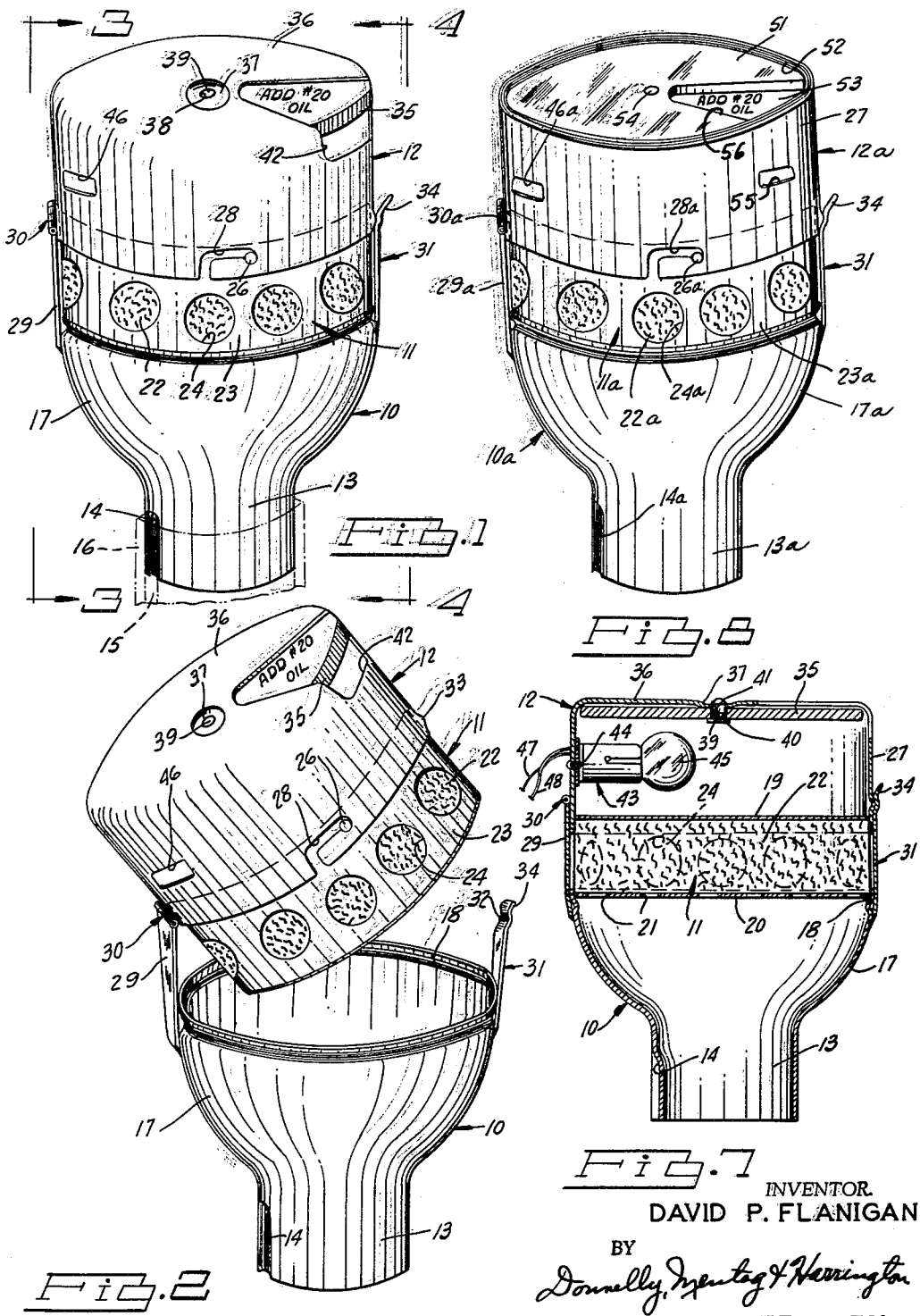

United States Patent Office 3,187,714
Patented June 8, 1965

---

3,187,714
ILLUMINATED OIL FILLER CAP WITH INDICATOR
David P. Flanigan, 2484 10th St., Wyandotte, Mich.
Filed Mar. 16, 1964, Ser. No. 352,260
12 Claims. (Cl. 116—133)

This invention relates generally to a novel and improved oil filler cap, and more particularly to an illuminated oil filler cap provided with an indicator means.

It is well known that if a particular lubricating oil is used consistently in an automobile engine and in the proper amount, the engine will fare better and be trouble-free throughout its useful life. The operators of automobiles, for examples, are careful to always use the same type of oil in the automobile engine. The automobile may, however, be driven sometimes by parties other than the owner and different types of oil may be inserted by such parties or by a gas station operator servicing the automobile. It is also well known that gasoline station operators sometimes accidentally spill oil on engines when oil is added through the oil filler pipe, which spillage causes smoke and fumes to be emitted from the engine hood when the engine is operated.

In view of the foregoing, it is an important object of the present invention to provide a novel and improved oil filler cap which will assist the owner of an automobile to insure that only one type of oil will be used in the engine of his automobile throughout the life of the same.

It is another object of the present invention to provide a novel and improved oil filler cap for an engine which is provided with an indicator means to insure that a gasoline station operator will be informed of the particular type of oil used in the engine so that he will only put in the desired type of oil when it is needed. This is especially helpful if the car is driven by someone other than the owner, and if he does not happen to know the type of oil used in the automobile. The information as to the type of oil used in the engine is readily available to the gasoline station operator without the necessity of his checking with the driver of the automobile who may not know the type of oil used in the car.

It is still another object of the present invention to provide a novel and improved oil filler cap for an engine which is provided with an indicator means and a light mounted below the indicator means to insure visibility of the indicator means and the opening into the oil filler pipe at night or at dusk so that the gasoline station operator may easily see the type of oil used in the automobile and the location of the oil filler cap and the entrance to the oil filler pipe.

It is still a further object of the present invention to provide a novel and improved filler cap which is provided with a lower portion formed as a funnel to insure that the gasoline station attendant will not spill oil over the engine when he has added oil thereto. The funnel shape permits the operator to add oil to the engine in a quick and efficient manner.

It is another object of the present invention to provide a novel and improved oil filler cap which includes a detachable filter which may be quickly and easily replaced. The accessibility of the filter encourages a gasoline station operator to clean the filter for the automobile owner more often than would normally be done. A larger filter can be used to give better filtering action to let the engine crankcase breath easier because of the particular construction of the oil filler cap of the present invention.

It is a further object of the present invention to provide a novel and improved oil filler cap which is provided with an indicator means for indicating the type of oil used in the engine and which may also be used to set forth other messages to a gasoline station operator or to the owner of the automobile that certain actions are to be taken at certain times, as for example, that the oil is to be changed when the next oil check shows that the oil level is down a predetermined amount.

It is a further object of the present invention to provide a novel and improved oil filler cap which is economical of manufacture, simple and compact in construction and efficient in operation.

It is another object of the present invention to provide a novel and improved oil filler cap which embodies a lower portion for attachment to the oil filler pipe of an engine and which is formed in the shape of a funnel, an indicator housing hingedly mounted on the funnel-shaped portion, a light mounted in the housing, an indicator means operatively mounted in the housing, and a filter detachably carried on the lower side of the hingedly mounted housing.

Other objects, features and advantages of this invention will be apparent from the following detailed description, appended claims, and the accompanying drawings.

In the drawings:

FIG. 1 is an elevational, perspective view of an illustrative embodiment of an illuminated, indicating oil filler cap made in accordance with the principles of the present invention;

FIG. 2 is a view similar to that of FIG. 1, but showing the indicator housing and filter being pivoted to an open position to permit oil to be poured into the funnel portion of the filler cap;

FIG. 3 is a side elevational view of the structure illustrated in FIG. 1, taken along the line 3—3 thereof and looking in the direction of the arrows;

FIG. 4 is a side elevational view of the structure illustrated in FIG. 1, with parts removed, taken along the line 4—4 thereof and looking in the direction of the arrows;

FIG. 5 is an exploded view of the oil filler cap of the present invention and showing the various parts thereof in a disassembled condition;

FIG. 6 is a reduced bottom view of the filter illustrated in FIG. 5, taken along the line 6—6 thereof and looking in the direction of the arrows;

FIG. 7 is an elevational sectional view of the structure illustrated in FIG. 3, taken along the line 7—7 thereof and looking in the direction of the arrows; and FIG. 8 is an elevational, perspective view of a modified oil filler cap made in accordance with the principles of the present invention.

Referring now to the drawings and in particular to FIGS. 1 and 2, wherein is shown an illustrative embodiment of the invention, the numeral 10 generally indicates the funnel portion of the filler cap which is formed in the shape of a funnel. The numerals 11 and 12 generally indicate a filter and an indicating means, respectively. The lower end of the filler cap funnel portion 10 is formed as a tube and is indicated by the numeral 13. The tubular portion 13 is provided with the vertically disposed indentation 14 which is adapted to receive a mating projection 15 on an oil filler pipe 16 of an engine. The upper end of the funnel portion 10 is flared outwardly in the shape of a funnel to provide an easy and efficient means for adding oil to an engine. As best seen in FIGS. 2 and 7, the upper rim of the funnel portion 17 is provided with a recessed seat 18 on which is seated the lower periphery of the filter 11.

The funnel portion 10 functions as the mounting portion and it may be made from any suitable material as, for example, sheet metal or aluminum. This part may be made by any suitable manufacturing process.

As best seen in FIGS. 2, 5 and 6, the filter 11 is formed as a cylindrical member having an outer diameter substantially equal to the diameter of the filter seat 18. The filter is provided with the closed upper wall 19 and the perforated bottom wall 20. The bottom wall 20 is provided with a plurality of openings 21 to expose the filtering mateiral 22 to the fumes emitted from the engine through the filler pipe. The filtering material 22 may be of any suitable conventional type. The filter side wall 23 is also provided with a plurality of openings 24 to expose the filtering material 22 to the atmosphere. As shown in FIGS. 1, 5 and 6, the filter is provided with a pair of retainer pins 25 and 26 for mounting the filter in the indicator housing 12, as more fully explained hereinafter.

The filter walls 19, 20 and 23 may be made from any suitable material, as for example, a suitable light metal. A filter 11 may be made as a throw-away unit which can be easily and quickly replaced after a predetermined number of cleanings or a predetermined time period.

The retainer pins 25 and 26 may be formed by any suitable means as, for example, they may be punched out of the filter side wall 23. Because of the ease in mounting the filter in its position on the indicator housing 12, the gasoline station operators will be encouraged to clean the filter for the user more often than they normally would.

As best seen in FIGS. 1 through 5, the indicator means 12 includes a housing which is provided with a side wall which is cylindrical in shape as indicated by the numeral 27. The indicator housing is open on the lower end thereof and receives the upper end of the filter 11, as shown in FIG. 7. The indicator housing is provided on the lower end thereof with a pair of diametrically disposed L-shaped slots 28 for the reception of the retainer pins 25 and 26. It will be seen that the filter may be quickly and easily mounted in place in the lower end of the indicator housing by moving the retainer pins 25 and 26 upwardly into the vertical leg of the L-shaped slot 28 and then rotating the filter clockwise a slight distance to move the pins into the horizontal portions of said L-shaped slot. It will be understood that any other suitable means may be used for detachably mounting the filter 11 in the lower end of the housing 12.

The indicator means 12 is hingedly mounted on the funnel portion 10 by means of the hinge arm 29 and the hinge 30. The lower end of the arm 29 is fixedly connected to the funnel portion 10 by any suitable means, as by spot welding. One portion of the hinge means 30 is fastened to the upper end of the arm 29 and the other portion of the hinge is operatively fixed to the outer side of the wall 27 of the indicator housing. The indicator means 12 and filter 11 are releasably mounted on the seat 18 and held in place thereon by means of the friction catch or lock means indicated by the numeral 31. The catch 31 is an elongated arm which is fixedly secured to the upper side of the funnel portion 10 by any suitable means, as by spot welding. The upper end of the catch is formed with a curved portion 32 which is adapted to be snapped over the projection 33 formed along the lower end of the housing wall 27 and at a point opposite the hinge 30. In order to swing the housing 12 and filter 11 to an open position, the user may grasp the upper end 34 of the arm 31 and spring it outwardly so as to detach the curved portion 32 from the projection 33.

As best seen in FIGS. 1, 5 and 7, the indicator means includes the rotor 35 which is mounted in the upper end of the indicator housing 27. The upper end of the housing is enclosed by the top wall 36 which is depressed at the center portion, indicated by the numeral 37, to form a washer or bearing means for the rotor 35. The depressed portion 37 is provided with a hole 38 through which is mounted the rivet 39 which functions to rotatably secure the rotor in place in the upper end of the housing and in abutment with the inner face of the depressed portion 37. The rivet is provided with the head 40 on the lower side thereof for retaining the rotor in place. As best seen in FIG. 5, the rotor is provided with a central hole 41 which the rivet passes through.

As shown in FIGS. 1, 2, 4, 5 and 7, the indicator rotor 35 is exposed through the opening 42 which is formed as a triangularly shaped segment when viewed from the top of the filler cap, and which is formed partially in the top wall 36 and in the indicator housing side wall 27. As shown in FIG. 5, the rotor 35 may be provided with any suitable message in the segments of the dial formed on the top side of the rotor. The user of the vehicle provided with a filler cap of the present invention may manually rotate the rotor 35 to expose the desired message. A few of the segments may be left blank so that the owner may write in any further message he may desire. The rotor 35 may be made from any suitable material which is adapted to be written on. On the other hand, stickers may be used to convey the message. The stickers may be adhered to the upper surface of the rotor 35 by any suitable means. The pressure of the rivet on the lower side of the rotor will provide sufficient frictional contact between the inner surface of the recessed portion 37 and the rotor, yet permit the rotor to be adjusted to a desired position. The indicator housing wall 27 may be made from any suitable material. It may also be made from any suitable plastic material which may be colored as desired, and which may be opaque. The retainer pins 25 and 26 are formed so as to provide a tight sliding frictional fit between the pins and the L-shaped slots 28 to maintain the filter in position in the lower end of the housing when it is swung to an open position.

As shown in FIG. 7, a light bulb housing or socket 43 is fixedly secured to the inside surface of the indicator housing wall 27 by any suitable means, as by the rivets 44. A light bulb 45 is detachably mounted in the light socket 43. As shown in FIGS. 1, 3 and 5, the indicator housing wall 27 is provided with a pair of spaced apart light holes 46 for emitting light to aid a gasoline station operator in the dark to locate the oil filler cap. It would be understood that light would also be emitted from the rotor access opening 42. If the housing for the indicator is made from a plastic material, light will also show through the plastic to indicate the position of the oil filler cap.

As shown in FIG. 3, the light socket 43 would be connected to two conventional lead wires 47 and 48 for connecting a light to the battery. One of the wires as 48 may be grounded. The other wire 47 would be connected to a suitable switch to the other side of the battery for lighting the bulb 45 at desired times. For example, the lead wire 47 may be connected by means of a suitable microswitch 49 to the positive side of the battery, and the microswitch 49 may be actuated by the action of the opening of the door of the vehicle or the opening of the engine hood of the vehicle. The wire 47 could also be connected to the vehicle dome light circuit or to the taillight circuit. The microswitch 49 could be mounted on the engine body in a position to be moved to the closed position or inoperative position when the hood is shut, and to the operative or open position when the hood is raised.

It will be seen that the light 45 provides a means whereby the gasoline station operator may quickly locate the oil filler cap and also be provided with light to help insert oil into the funnel portion 10 in the night. When the indicator housing 12 and filter 11 are swung to the open position, light will be shown through the slots 46 and over the upper end of the funnel portion 10 to show the loction of the funnel opening.

FIG. 8 shows a slightly modified oil filler cap made in accordance with the principles of the present invention. The only difference between the embodiment of FIG. 8 and the aforedescribed first embodiment is that the rotor 51 is rotatably mounted in a peripheral recess 52 formed on the upper end of the indicator housing 12a. The rotor 51 is held in a rotatable position on the indicator housing upper end wall 53 by any suitable means, as by the rivet indicated by the numeral 54. As shown in FIG. 8, the messages concerning the type of oil to be added and so forth would be put on the dial formed by the top side of the housing wall 53. The top side of the housing wall 53 may be provided with a suitable covering, if desired, for putting the messages thereon. The rotor 51 is provided with an opening 56 for viewing the messages on the wall 53. The rotor 51 would be set to dispose the opening 56 over the desired message. The rest of the structure of the embodiment of FIG. 8 is the same as the first described embodiment and the corresponding parts have been marked with the same reference numerals followed by the small letter "a". This embodiment is further provided with additional light slots as indicated by the numeral 55. It will be understood that the embodiment of FIG. 8 is also provided with a light means which would function in the same manner as the light means of the first embodiment. The indicator housing 12a for the embodiment of FIG. 8 may also be made from any suitable plastic to emit light therefrom. The plastic may be tinted as desired. It will be seen that the oil filter cap of the present invention will aid the owner of a car in insuring that only the type of oil is used which he desires to be used in his vehicle. The light means will also assist the gasoline station operator in locating the filler cap in the dark. The funnel portion assists the gasoline station attendant in adding oil to the engine without spilling any on the engine.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:

1. An oil filter cap for closing the open end of an engine oil filler pipe, comprising; a mounting portion for mounting the oil filler cap on the oil filler pipe; and, an information indicator means carried on the mounting portion.

2. An oil filler cap for enclosing the open end of an engine filler pipe, comprising: a mounting portion for mounting the oil filler cap on the oil filler pipe; and, an information indicator means carried on the mounting portion and being movable between closed and open positions.

3. An oil filler cap for enclosing the open end of an engine filler pipe, comprising: a mounting portion for mounting the oil filler cap on the oil filler pipe; said mounting portion being formed in the shape of a funnel; and, an information indicator means carried on the upper end of the funnel shaped mounting portion and being movable between open and closed positions to permit adding of oil through the funnel shaped mounting portion into the oil filler pipe.

4. An oil filler cap as defined in claim 3, wherein: said information indicator means comprises a housing swingably mounted on the upper end of the funnel shaped mounting portion, a rotor operatively mounted in said housing and having information data carried thereon, and said housing beng provided with an opening to permit viewing of the rotor.

5. An oil filler cap as defined in claim 3, wherein: said information indicator means comprises a housing swingably mounted on the upper end of the funnel shaped mounting portion, informational data carried on the outer upper end of the housing; a rotor having an opening formed therethrough rotatably mounted on the upper outer side of the housing; and, said informational data on the upper end of the housing being viewable through the opening in said rotor.

6. An oil filler cap as defined in claim 3, including a filter detachably mounted on said information indicator means.

7. An oil filler cap as defined in claim 3, wherein: said indicator means as provided with a means for illuminating the indicator and the funnel shaped mounting portion when the indicator means is moved to the open position.

8. An oil filler cap for enclosing the open end of an engine filler pipe, comprising: a mounting portion for mounting the oil filler cap on the oil filler pipe; a housing hingedly mounted on said mounting portion; a filter detachably mounted in the lower end of said housing; and, an information indicator operatively mounted on said housing.

9. An oil filler cap as defined in claim 8, wherein: said mounting portion is formed in the shape of a funnel.

10. An oil filler cap as defined in claim 8, wherein: said housing is formed from a material adapted to pass light therethrough, an illuminating means is operatively mounted in said housing.

11. An oil filler cap as defined in claim 8, wherein: said information indicator includes a rotor rotatably mounted in said housing and having information data carried thereon, and said housing being provided with an opening to permit viewing of the rotor.

12. An oil filler cap as defined in claim 8, wherein: said information indicator includes informational data carried on the outer upper end of the housing, a rotor having an opening formed therethrough rotatably mounted on the upper outer end of the housing, and said informational data is viewable through the opening in said rotor.

References Cited by the Examiner

UNITED STATES PATENTS

| | | | |
|---|---|---|---|
| 650,617 | 5/00 | Salmon | 222—192 |
| 1,585,562 | 5/26 | Rylander | 184—90 |
| 1,677,155 | 7/28 | Swift | 215—38 |
| 1,689,800 | 10/28 | Parker | 184—91 |
| 7,712,592 | 5/29 | Tomlinson | 141—338 |
| 1,792,824 | 2/31 | Dearborn | 220—44 |
| 2,675,093 | 4/54 | McCall et al. | 220—44 |

LOUIS J. CAPOZI, Primary Examiner.